July 10, 1973   W. SCHELKMANN   3,745,084
APPARATUS FOR RETREADING OF VEHICLE TIRES
Filed July 24, 1970   3 Sheets-Sheet 1

INVENTOR
WILHELM SCHELKMANN
BY
ATTORNEY

United States Patent Office 3,745,084
Patented July 10, 1973

3,745,084
APPARATUS FOR RETREADING OF VEHICLE TIRES
Wilhelm Schelkmann, Crengeldanzstr. 85, Witten, Germany
Filed July 24, 1970, Ser. No. 58,107
Claims priority, application Germany, Nov. 10, 1969, P 19 56 391.8
Int. Cl. B29h 5/04
U.S. Cl. 156—394          14 Claims

ABSTRACT OF THE DISCLOSURE

Retreading of vehicle tires is accomplished by forming an assembly consisting essentially of a tire carcass having a circumferential face, profiled tread means of elastomeric material superimposed upon the circumferential face and a bonding material between the carcass and the tread means. The assembly is confined in a flexible fluid-tight enclosure, the interior of the enclosure is exhausted of at least the major portion of entrapped air, and a pressure differential is established between the interior and the exterior of the enclosure in a sense exerting pressure upon the latter and expelling residual air confined between the circumferential face and tread means. The assembly is then vulcanized for permanently bonding the tread means to the circumferential face. An apparatus is also disclosed.

BACKGROUND OF THE INVENTION

The present invention relates generally to the retreading of vehicle tires.

The retreading of vehicle tires is already well known, and a variety of methods and apparatus have become known for practicing such retreading. The retreading utilizes, generally speaking, either elongated retreading strips which are provided with a raised tread profile and are prevulcanized and applied to the circumferential face of the vehicle tire to be retreaded, or individual tread segments which are placed onto the circumferential face of the tire in adjacent and abutting relationship. In either case they are usually flat whereas the circumferential face of the vehicle tire is of course transversely—i.e., axially with reference to the tire—curved. Because both the tire and the retreading strip or strip segment are vulcanized they are elastic, meaning that they tend to return to their original shape when deflected from the same. As a result, the elements when placed upon one another—that is when the tread strip or tread strip segment is placed upon the circumferential face of the vehicle tire—have a tendency to return to their original form, with the tread strip tending to return to its flat shape from the curved configuration to which it is deflected when it is placed into surface-to-surface contact with the circumferential face of the vehicle tire. In attempting to bond the tread strip to the vehicle tire by means of a non-vulcanized bonding layer, a separation of bond results from this tendency particularly if the bonding layer is subsequently warmed for vulcanizing purposes. It must be kept in mind here that conventionally the tread strip or tread strip segment is bonded to the surface of the vehicle tires by means of such a bonding layer so that the two will form an assembly in which they are temporarily held in their proper position, which assembly is then subsequently subjected to vulcanizing to make the bond premanent. When such vulcanizing occurs, however, that is when heat is applied for vulcanizing purposes, the bonding layer no longer retains the tread strip in its position on the circumferential face of the vehicle tire and separation occurs so that proper vulcanizing cannot take place. This is due to the fact that the bonding layer's bonding ability becomes smaller during heating requisite for vulcanizing, than the tension exerted by the tread strip or tread strip segment tending to return to its flat condition.

Naturally, this is not acceptable and attempts have therefore been made to overcome the problem. One of these involves placing a steel tape around the exterior side of the tread strip and to accommodate a tube or hose in the interior of the tire which is expanded by admitting pressure fluid into it whereby the tire is radially outwardly stressed against the steel tape and the tread strip is thus forced against the circumferential face of the tire. However, this is not only rather a time-consuming and expensive approach to the problem, but also the resulting finished product suffers from a high percentage of defects which must then be discarded. Another approach involves an elastic form which accommodates the vehicle tire and tread strip or tread strip segment during vulcanizing and subjects them to pressure. It has been found, however, that it is impossible to reliably prevent profile shifts at the profile base, that is the portions of the tread strip or tread strip segment which are closest to the vehicle tire surface, because the pressure is exterted only upon the outermost surfaces of the profiles or treads. A further difficulty with this approach is that the form overlies only the outer most surfaces of the treads or profiles so that air becomes accommodated in the valleys or depressions between adjacent treads or profiles with a resultant reduction of the pressure exerted by the form. This in turn causes a porous vulcanizing and the material of the bonding layer does not properly flow to all surface portions to effect bonding thereat. Because a tire having these problems would not be capable of withstanding the stresses to which it will be subjected during ordinary use, it must be discarded.

A further problem encountered in the prior art in this connection is the development—where a form was used for accommodating the tire-tread assembly—of a pressure differential between the exterior and the interior of the form, that is a differential in a sense exerting pressure upon the assembly. Evidently, it is possible either to produce a vacuum in the interior of the form which latter is flexible so that it is pressed inwardly by the ambient atmospheric pressure, or to produce an overpressure at the exterior of the form, or else to combine the two. However, use of the known prior-art approaches in actual practice has shown that neither of the two primary possibilities, or a combination of them, is entirely sufficient to produce completely acceptable results, because always it has been found that approximately 20% gaseous matter is retained in the interior of the form, in form of residual air which is retained and accommodated in the valleys or depressions between adjacent projecting profiles, whereby proper vulcanization is prevented.

SUMMARY OF THE INVENTION

It is, accordingly, an object of the present invention to provide a solution to the aforementioned disadvantages of the prior art.

More particularly it is an object of the present invention to provide an improved retreading method for vehicle tires.

It is also an object of the invention to provide an apparatus for carrying out the new method.

In pursuance of the above objects, and others which will become apparent hereafter, one feature of the invention resides in a retreading method for vehicle tires which, briefly stated, comprises forming an assembly consisting essentially of a tire carcass and having a circumferential face, profiled tread means of elastomeric material superimposed upon said circumferential face, and a bonding material between the carcass and the tread means. The assembly is confined in a flexible fluid-tight enclosure and the major portion of air contained in this enclosure is exhausted. A pressure differential is established between the interior and the exterior of the enclosure in a sense exerting pressure upon the latter and expelling residual air confined between the circumferential face and the tread means. The assembly is then vulcanized for permanently bonding the tread means to the circumferential face.

By resorting to my novel method the disadvantages of the prior art are avoided. This includes a proper non-porous vulcanization of the bonding material, and of course also a proper flowing of the same. According to the invention the fluid-tight enclosure will be depressed into the recesses or depressions between adjacent ones of the projecting profiles down to the lowest level of these depressions, where it will exert an even and constant pressure necessary for proper flowing of the bonding material.

According to the invention the flexible fluid-tight enclosure may be composed of elastomeric sheet material and the necessary enclosure tension—which varies with the depth between the highest and lowest points of the profile—is established in any given case by the composition of the elastomeric sheet material used for making the enclosure as well as by the thickness of the sheet material. Of course, it is possible to use several overlying layers of sheet material of different compositions or materials.

In order to assure a proper fluid-tight contact of the enclosure, especially if the enclosure is a partial enclosure, as will be discussed later, the latter is provided with reinforced annular edges which in operating condition receive a pretensioning by increase of their diameter and thus produce a mechanically tight engagement with the vehicle tire. Such an arrangement has the additional advantage that it is possible to push or place under these reinforced edges—which in the case of a partial enclosure abut the lateral faces of the vehicle tire—a further auxiliary enclosure. It is advantageous to place a ring-shaped member under the enclosure in such a manner that it overlies the free edges of the tread means where the same terminates at the lateral sides of the vehicle tire and where the flowing bonding material can escape between the tread means and the circumferential face of the tire. This is of course done at both lateral sides of the tire and has the additional purpose of establishing a path for the escape of gaseous fluid from between the tread face. Also, such ring members prevent excess or overvulcanization by delaying the conduction of heat through the non-vulcanized bonding material or the like which is below them.

According to the invention it has been recognized that the escape of residual air or gaseous fluid from between the tread means and the circumferential face of the tire is necessary even at the lowest point of the profile depressions as they will be called hereafter, that is the depressions between adjacent ones of the projecting tread profiles. This is necessary to prevent the formation of air bubbles at this lowest point between the tread means and the circumferential face of the tire. Unless this is done, proper flowing of the bonding material and proper bonding thereof with both the tread means and the vehicle tire cannot be assured. It is possible to evacuate such residual air to the exterior of the enclosure, but it is also possible and entirely permissible within the context of the invention to simply evacuate the residual air from between the tread means and the circumferential face of the vehicle tire into incisions provided at the highest or exposed surfaces of the tread profiles, into which incisions the fluid-tight enclosure is not deflected when the pressure differential is established and where no vulcanization takes place. Accordingly, if the residual gaseous fluid is entrapped in such incisions or grooves or the like, it is of no disadvantage there.

The fluid-tight enclosure itself may consist of one or more sheets of elastomeric material, for instance natural or synthetic rubber and it is immaterial whether the individual sheets consist of the same or of different materials. It is also possible, as already suggested before, to use two superimposed enclosures in conjunction with one another. These measures are of course advisable for purposes of regulating the intrusion or deflecting of the enclosure into the profile depressions in dependence upon the spacing between the profiles, in order to obtain the desired pressure necessary for proper vulcanization.

According to the present invention the underface of the tread means, that is the face which is directed towards the circumferential face of the vehicle tire when the tread means is placed upon the latter, is flat in the circumferential direction of the tire. This is particularly important when the tread means is composed of a plurality of tread strip sections which are placed onto the circumferential tire face in abutting relationship. Thus any air entrapped underneath the tread strip sections between the same and the circumferential face of the tire can escape by passing between the abutting edges of adjacent tread strip sections and/or through suitable passages provided for evacuation to the exterior of the enclosure or for accumulation in the aforementioned incisions or grooves in the exposed outer surfaces of the profiles themselves.

I further assure proper bonding of the components of the assembly by accommodating it in a pressurized environment. If the strip or strip sections are to be subjected to rolling, that is to pressing them with a rolling action against the circumferential face of the tire, then the entire air entrapped between the tread strip or tread strip sections and the circumferential face is expelled and removed by the overpressure exerted upon the exterior of the enclosure. Separation of the lateral edges of the tread strip or tread strip sections from the circumferential face of the tire during the vulcanizing process is avoided by a preliminary bonding operation utilizing either a known high-frequency welding method, a liquid or a pulverulent bonding material. This is of course true also of the edges of adjacent tread strip sections where the same abut. However, the necessary pressure preventing such separation—rather than preliminary bonding—can be provided by surrounding the assembly with a plastic casing which may surround the entire tire and exert the necessary pressure upon the tread means. Preferably but not necessary a sheet of natural or synthetic rubber will be placed over the tread means within the plastic casing so as to provide continuity between different levels of tread strip or tread strip segments and tire and to provide a forming action for the material at the juncture between the edges of the tread strip or tread strip segments and the tire. The plastic casing is closed by welding, with a zipper closure or the like, and may be provided with reinforced closure edges which extend approximately parallel to the closure at one or both sides of the latter if necessary. It is made of inexpensive plastic material and is used only once, namely for the making of a single retreaded tire.

The assembly consisting essentially of a tire carcass, tread means placed on the circumferential face thereof and bonding material, and accommodated in a flexible fluid-tight enclosure and/or the plastic casing mentioned above, is accommodated in an autoclave where overpressure is produced. In order to achieve proper retention of the tread means with reference to the circumferential face of the tire it is advantageous to utilize the overpressure in the autoclave on the outer side of the enclosure to compress residual air which may still be located in the profile depressions in order to provide the necessary and desired pressure at the base or bottom of these profile depressions. It has been found advantageous to place a single assembly, or a plurality of such assemblies, onto a support such as a rack provided in the autoclave in such a manner that the two connect the interior of the assembly (or of all assemblies if more than one is accommodated in the autoclave) with the exterior of the latter, and this may be accomplished by individual conduits or by a single conduit with which the interior of all assemblies is in communication. A suitable regulating valve will then be provided in this conduit. The rack or the like may be provided with an interior chamber in which air expelled from the assemblies may be compressed. To prevent small deformations resulting from the inherent weight of the assemblies, deformations which might possibly aid in separation of the edges of the tread means from the respective tires, a medium is used in the autoclave whose specific weight corresponds at least substantially to that of the tires. It is especially advantageous if the assemblies accommodated in the fluid-tight enclosure are placed initially under compressed fluid of approximately 1–2 atmospheres, to thereby test whether the assembly is really tight. Subsequently the compressed gaseous fluid is then replaced with a hot liquid, usually water, at approximately 5 atmospheres overpressure. The replacement or exchange can be carried out in a manner still to be discussed in detail.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
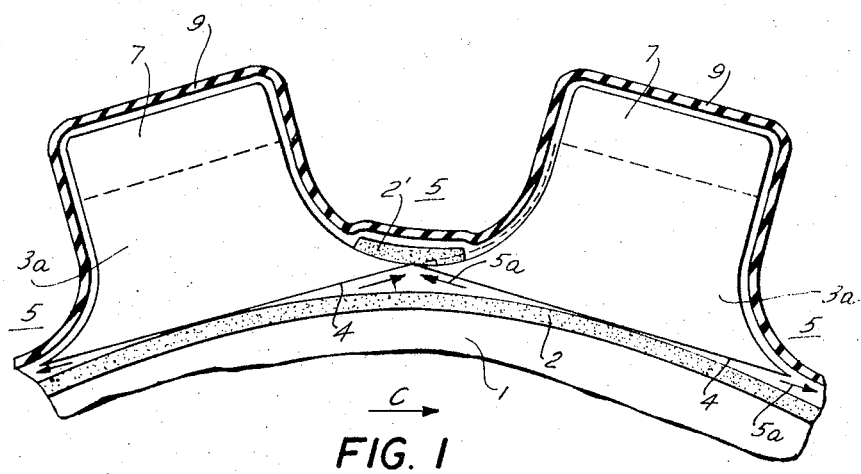
FIG. 1 is a fragmentary section—normal to the axis—through a vehicle tire and showing tread means in form of two individual tread profiles.

Discussing firstly the embodiment illustrated in FIG. 1 it will be seen that reference numeral 1 identifies a tire to be retreaded. Onto the circumferential face of this tire, whose circumferential direction is identified by the arrow C, is applied a layer 2 of bonding material such as rubber or the like. Placed over the layer 2 is the tread means, identified with reference numeral 3a in FIG. 1. In FIG. 1 the tread means is in form of individual tread profiles whose underfaces 4a which face the circumferential surface of the tire 1 are flat and planar in the circumferential direction C. In transverse direction of the tire 1 they have approximately the same curvature as the circumferential face of the tire itself. Because of the planar configuration of the underface 4 there will first be abutment between the underface 4 and the circumferential surface of the tire 1 approximately at the middle of the respective tread profile 3a and pressure acting in the direction towards the circumferential face of the tire 1 onto the tread profiles 3a, will cause a pressure differential from the point of initial abutment to the lowest points 5 of the profile depressions. Entrapped air thus flows in the direction of the small arrows 5a to the lowest points 5. Reference numeral 9 identifies a fluid-tight enclosure of elastomeric material which surrounds the assembly in the manner still to be described, in accordance with the invention. The exposed outer surfaces of the profiles 3a are provided with grooves, incisions or the like identified with reference numeral 7 and shown diagrammatically in FIG. 1, and a path 6 is shown over which the air escaping in the direction of the arrows 5a can pass from the lowest points 5a within the enclosure 9 into the grooves 7 into which the enclosure 9 does not enter and where no vulcanization takes place, so that the air can remain in these grooves 7 without deleterious effects upon the vulcanizing operation. If desired, however, the air can also be evacuated to the outside of the enclosure 9. Reference numeral 2' identifies further bonding material —for instance the same as the layer 2—by means of which with the tire 1 is to be accommodated and facilitated.

Figure 2:
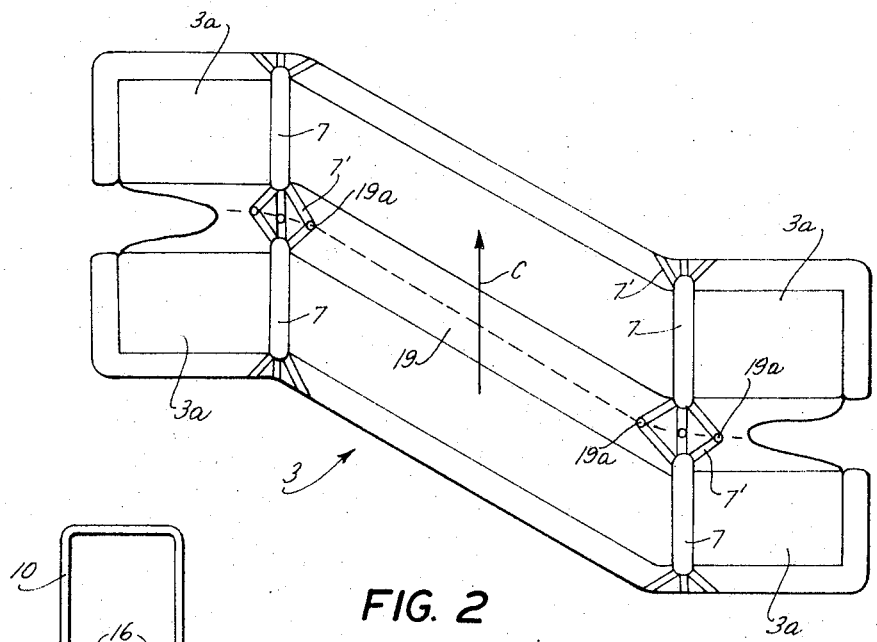
FIG. 2 is a top-plan view of a tread segment also with two profiles but different from what is illustrated in FIG. 1.

FIG. 2 shows a tread segment where the profiles 3a —rather than being individual as in FIG. 1—are connected with one another. In FIG. 2 the profile or tread segment 3 is placed upon the circumferential surface of the tire (not illustrated) in such a manner that it is oriented with respect to the circumference of the tire as illustrated by the arrow C associated with FIG. 2. Here, the profiles 3a are connected with a skin of elastomeric material 19 which may be provided with openings 19a for escape of air from between this skin and the circumferential surface of the tire 1. Grooves 7' connect the grooves or incisions 7 and the openings 19a for passage of the air.

Figure 7:
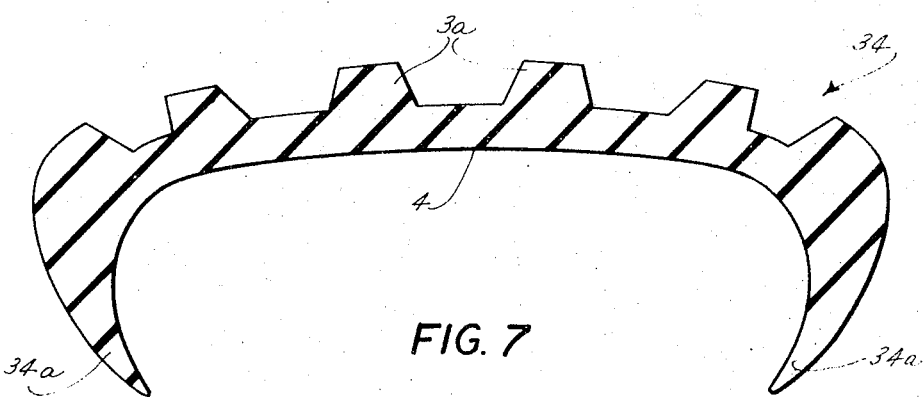
FIG. 7 is a cross-section through a further tread strip construction.

In FIG. 7 I have illustrated a further tread means embodiment, here in form of an elongated tread strip where the profiles are again identified with reference numeral 3a but where the tread strip itself is identified with reference numeral 34. Here the tread strip has curved lateral edge portions 34a which partially overlie the lateral edge faces of the tire.

Figure 3:
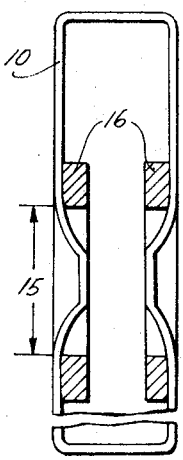
FIG. 3 is a somewhat diagrammatic cross-section through a partial fluid-tight enclosure per se.
Figure 4A:
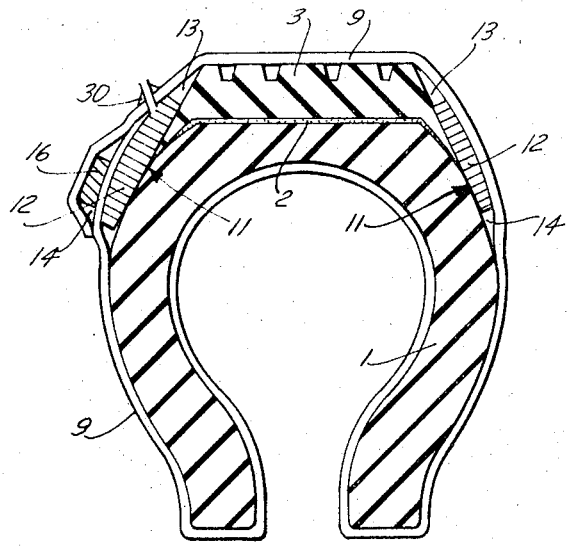
FIG. 4a is a fragmentary cross-section through an assembly accommodated in an enclosure analogous to that of FIG. 3 but completely enclosing the assembly—both exteriorly and interiorly.
Figure 4B:
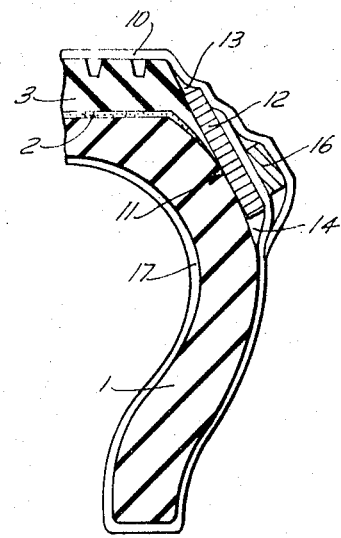
FIG. 4b is a view similar to FIG. 4a but illustrating the use of a partial enclosure with a supplementary enclosure.

FIG. 4a shows that the assembly of tire, tread strip, tread strip sections or profiles and bonding material interposed between them is accommodated in a complete or full fluid-tight enclosure 9 or in a partial enclosure 10. The tension of the enclosure in any case is so selected that the enclosure will be deflected into each depression 5 in the manner shown in FIG. 1 when exterior overpressure of requisite magnitude is exerted so that adequate pressure is exerted at the lowest point of each profile depression 5 that the material 2 and 2' will flow during vulcanizing and provide proper bonding without separation of the tread means from the surface of the vehicle tire. FIG. 3 shows a partial enclosure 10 of the type used in FIG. 4b, where the inner open edges of the annular enclosure 10 are reinforced by means of elastomeric or other reinforcing rings 16 secured to the material of the enclosure 10 in suitable manner. The enclosure 10 is of flat sheet material, such as rubber or synthetic plastic material, and its center opening is identified by the dimensions of the arrow 15 and is forced open by enlarging in order to introduce the assembly into the enclosure 10. The reinforcing rings 16 tend to counter such deflection. Valve connections or nipples or the like can be provided on the enclosure for connecting the interior thereof with the exterior. The purpose of the reinforcing ring 16 which may be of elastomeric material also, is not only to provide reinforcement but also to provide a possibility of connecting an auxiliary enclosure 17 which may for instance also enclose the interior of the tire carcass as shown in FIG. 4b. This is simply accomplished by pushing edge portions of such auxiliary enclosure 17 under the reinforcing rings 16 whereby a fluid-tight connection is established by engagement of the rings 16 with the portions of the auxiliary enclosures 17 which have been pushed under them.

Figure 6:
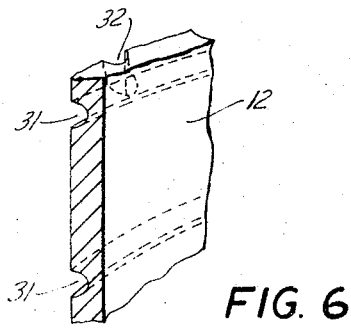
FIG. 6 is a fragmentary partially sectioned perspective illustrating a detail of a ring member such as is shown in use in FIGS. 4a, 4b and 5.

Both in FIGS. 4a and 4b ring members 12 are placed under the enclosures 9 (or 10) so as to overlie the junction 11 between the lateral edges of the tread means and the vehicle tire, at which juncture the material of the layer 2 will tend to escape when it starts to flow during vulcanization. The edges of these rings 12 form channels 13 and 14 through which gaseous fluid can pass as it is evacuated. FIG. 6 shows that it is also possible to form annular channels 31 and to connect these at desired spacing via connecting channels 32 with the channels 13 and 14. (Compare FIGS. 4a, 4b and 6).

Figure 5:
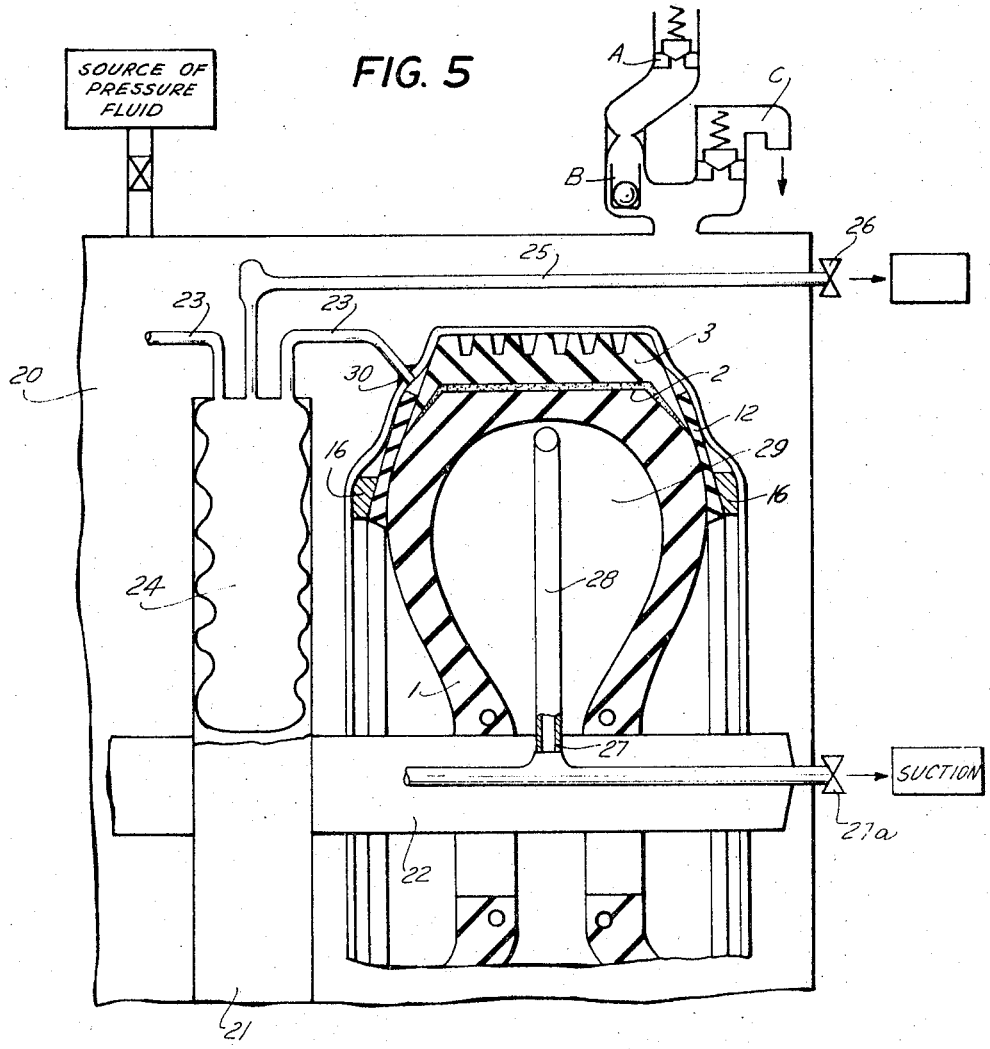
FIG. 5 is a somewhat diagrammatic view illustrating an assembly according to the present invention accommodated in an autoclave.

FIG. 5 shows an assembly accommodated, in accordance with the present invention, in a fluid-tight enclosure, arranged in an autoclave 20. The necessary overpressure may readily be established by means of compressed gas, or by means of steam or hot water or the like. According to the invention it is particularly advantageous if the interior of the autoclave 20 is first filled with compressed air at between 1 and 2 atm. overpressure in order to test whether the assembly is fluid-tightly accommodated in the enclosure, and if subsequently this air is replaced with hot water at approximately 5 atm. overpressure to initiate the desired vulcanization. To accomplish this an overpressure valve A responsive to approximately 2 atm. overpressure is provided and an automatically operating venting valve B is placed ahead of the overpressure valve A whereby the pressure exchange between air and water takes place automatically when water is admitted. Of course, such valves are completely conventional and need therefore not be further described. This is also true of the overpressure valve V which prevents the development of excess pressure in the autoclave and which for this purpose is accommodated in a branch of the conduit ahead of the valve B and responsive to a pressure of 5 atm. overpressure.

According to the invention it is particularly advantageous to accommodate a frame or similar support 21 in the autoclave 20, which is provided with arms or projections 22 on which the assemblies to be vulcanized are supported. The interiors of the flexible enclosures are then placed in communication with a bellows 24 in the interior of the support 21 via hoses 23, and the bellows in turn is connected via a conduit 25 and a regulating valve 26 with the exterior, or with suction or other devices. A source of pressure fluid is diagrammatically illustrated in FIG. 5. Residual air escaping from the interior of the devices or assemblies becomes compressed in the bellows 24 until it reaches a predetermined pressure in which case it is vented via the valve 26 to the atmosphere or whatever device is connected with the conduit 25.

The residual air which will invariably remain in the interior space 29 of the respective tire is withdrawn via a valve 27a to the exterior by means of a nipple 27 which is connected with a hose 28 leading to the highest point in the interior space 29 of the tire. The nipples 27 of all tires accommodated in the autoclave 20 at one and the same time may be connected through a conduit extending through the arm 22 of the support, or the arm 22 itself may be hollow and configurated as a conduit provided for this purpose. All residual air, which cannot be so removed, is conveyed in this manner to the highest point within the tires whereby a uniform heating of the tire is guaranteed and all faults in form of locally insufficient heating is thereby reliably avoided.

Figure 8:
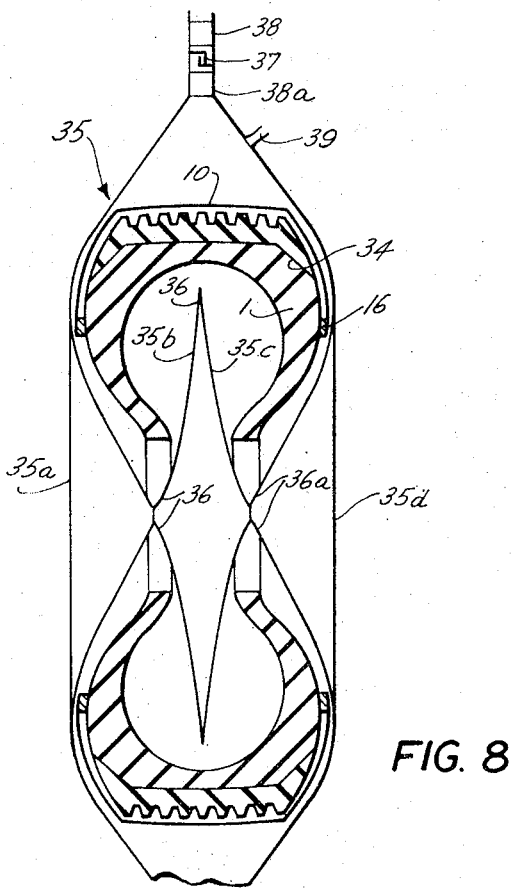
FIG. 8 is a cross-section through an assembly accommodated in a plastic casing according to the invention.

FIG. 8, finally, shows that the tread means which is here identified as the tread strip 34 of FIG. 7, can also be held in position by means of a plastic casing 35. It is composed of four annular sheet-material cut-outs 35a, 35b, 35c and 35d which are welded or otherwise secured along seams 36, leaving an opening 36a at the center. Closure can for instance be effected by means of a zip closure 37 which is provided at its opposite lateral sides with sealing rings 38 and 38a. A nipple or valve connection 39 may also be provided in this plastic casing 35 which accommodates in its interior the assembly together with a fluid-tight enclosure 9 of the type shown in FIG. 4a or enclosure 10 of the type shown in FIG. 4b, and which is illustrated in FIG. 8. The entire assembly as shown in FIG. 8 may be incorporated an autoclave as shown in FIG. 5, or the plastic casing 35 itself may replace the autoclave and may accommodate the pressure fluid and/or vulcanizing fluid.

It will be understood that each of the elements described above, or two or more together, may also find a useful application in other types of constructions differing from the types described above.

While the invention has been illustrated and described as embodied in a method and apparatus for retreading of vehicle tires, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An apparatus for retreading vehicle tires, comprising enclosure means for at least in part confining an assembly which is essentially composed of a tire carcass having a circumferential face, profiled tread means and a bonding material between said tread means and said circumferential face, said enclosure means including an annular bag of elastomeric material having a center opening bounded by circumferential edge portions, and reinforcing portions integral with said enclosure means and reinforcing said edge portions so that the latter exert pressure upon the assembly accommodated in said enclosure and effect seal-tight engagement with said assembly; said enclosure means being deflectable into pressure-contact with said profiled tread means; and vulcanizing means for vulcanizing said tread means and carcass so as to join them together while deflected.

2. An apparatus as defined in claim 1, said assembly having an exterior and a hollow interior; and wherein said enclosure means encloses both said exterior and said interior.

3. An apparatus as defined in claim 1, wherein said enclosure means consists at least predominantly at least two superimposed shaped layers of elastomeric sheet material.

4. An apparatus as defined in claim 3, wherein said layers consist of identical elastomeric material.

5. An apparatus as defined in claim 3, wherein said layers consist of different elastomeric materials.

6. An apparatus for retreading vehicle tires, comprising enclosure means for at least in part confining an assembly which is essentially composed of a tire carcass having a circumferential face, profiled tread means and a bonding material between said tread means and circumferential face, said enclosure means comprising four annular sheet material sections each having a center opening bounded by an inner marginal circumferential portion, said inner marginal circumferential portions being fluid-tightly connected with one another and having outer margins sealed together, said inner marginal portions enclosing when connected each bead of the carcass, said enclosure means being deflectable by pressure in an autoclave into pressure contact with said profiled tread means; and vulcanizing means for vulcanizing said tread means and carcass so as to join them together while deflected.

7. An apparatus as defined in claim 6, said sections each also having an outer marginal circumferential section; and further comprising releasable closure means for connecting said outer marginal circumferential sections fluid-tightly with one another; and annular reinforcing means extending along said closure means at least at one radial side of the latter.

8. An apparatus as defined in claim 6, wherein said closure means comprises zipper closure means.

9. An apparatus as defined in claim 6; and further comprising an inner enclosure of elastomeric material overlying said tread means and carcass within said enclosure means.

10. An apparatus as defined in claim 6, and further comprising autoclave means in which said enclosure means and assembly are accommodated; conduit means communicating with the interior and the exterior of said autoclave means; an overpressure valve in said conduit means responsive to substantially two atmospheres overpressure, and a venting valve in said conduit means upstream of said overpressure valve and operative for closing at substantially 5 atmospheres overpressure.

11. An apparatus as defined in claim 6, said assembly being annular and having an exterior and a hollow interior communicating with said exterior via a center aperture, and said means including a first enclosure portion enclosing only said exterior with said circumferential edge portions encircling said aperture, and a discrete second enclosure portion accommodated in said interior, said second enclosure portion having marginal portions which are located at the exterior of said assembly, and confined between said carcass and said circumferential edge portions in seal-tight relationship with both.

12. An apparatus for retreading vehicle tires, comprising enclosure means for at least in part confining an assembly which is essentially composed of a tire carcass having a circumferential face and having annular lateral faces at opposite axial sides of said circumferential face, profiled tread means and a bonding material between said tread means and said circumferential face; a pair of rigid ring members each overlying one of said annular faces of said tire carcass, said rigid ring members being confined between said annular lateral faces and said enclosure means and having inner and outer edges which define with the respective lateral face and with said enclosure means respective evacuating channels for gaseous fluid, said enclosure means being deflectable into pressure-contact with said profiled tread means; and vulcanizing means for vulcanizing said tread means and carcass so as to join them together while deflected.

13. An apparatus as defined in claim 12, said ring members each having two major surfaces and being provided in at least one of said major surfaces with at least one circular groove and at least one radial groove communicating with said circular groove and at least one of said evacuating channels.

14. An apparatus as defined in claim 13, wherein said ring members are composed of material having poor thermal conductivity.

References Cited

UNITED STATES PATENTS

| | | | |
|---|---|---|---|
| 3,325,326 | 6/1967 | Schelkmann | 156—96 |
| 3,236,709 | 2/1966 | Carver | 156—96 |
| 3,207,647 | 9/1965 | Schelkmann | 156—394 |
| 3,283,795 | 11/1966 | Schelkmann | 156—96 |
| 1,118,504 | 11/1914 | McLeod | 18—6 T |

FOREIGN PATENTS

| | | | |
|---|---|---|---|
| 92,699 | 10/1959 | Netherlands | 156—96 |

ALFRED L. LEAVITT, Primary Examiner

C. B. COSBY, Assistant Examiner

U.S. Cl. X.R.

156—96; 264—36, 315; 425—DIG. 19, 39, 43, 45